Figures 1, 2:
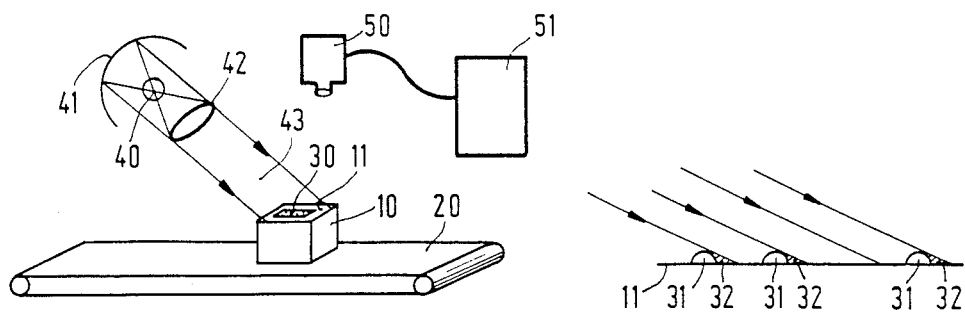

United States Patent [19]

van Hulzen et al.

[11] Patent Number: 4,771,165

[45] Date of Patent: Sep. 13, 1988

[54] DEVICE FOR OPTICALLY IDENTIFYING OBJECTS

[75] Inventors: Geerhard van Hulzen; Loth Voskuilen, both of Eindhoven, Netherlands

[73] Assignee: U.S. Philips Corporation, New York, N.Y.

[21] Appl. No.: 33,128

[22] Filed: Mar. 31, 1987

[30] Foreign Application Priority Data

Apr. 3, 1986 [NL] Netherlands .......................... 8600849

[51] Int. Cl.[4] .............................................. G06K 7/10
[52] U.S. Cl. .................... 235/470; 235/454; 235/490; 250/569
[58] Field of Search ............... 235/454, 455, 456, 470, 235/487, 490; 250/566, 568, 569

[56] References Cited

U.S. PATENT DOCUMENTS

| 4,193,540 | 3/1980 | Dougados et al. | 235/454 |
| 4,201,338 | 5/1980 | Keller | 235/454 |
| 4,204,638 | 5/1980 | Laude | 235/454 |
| 4,217,487 | 8/1980 | Kjeer | 235/455 X |
| 4,263,504 | 4/1981 | Thomas | 235/454 |
| 4,625,101 | 11/1986 | Hinks et al. | 235/490 X |

FOREIGN PATENT DOCUMENTS

| 0134996 | 3/1985 | European Pat. Off. | |
| 1474318 | 10/1969 | Fed. Rep. of Germany | 235/454 |
| 61-148579 | 7/1986 | Japan | 235/454 |
| 1580735 | 12/1980 | United Kingdom | |

Primary Examiner—Philip H. Leung
Attorney, Agent, or Firm—James J. Cannon

[57] ABSTRACT

An identification code provided in relief on an object is read in that a radiation beam is obliquely incident on the surface on which the identification code is provided, and in that the identification code is observed by a detection system by means of the shadows thus cast.

6 Claims, 1 Drawing Sheet

DEVICE FOR OPTICALLY IDENTIFYING OBJECTS

The invention relates to a device for optically identifying objects a surface of which has a relief structure whose details constitute an identification pattern, which device comprises a radiation source emitting a radiation beam to the surface, and a radiation sensitive detection system in the path of the radiation originating from the surface.

A device of this type is known from the British Patent Specification No. 1,580,735 for reading an identification code consisting of projections provided in the wall of a glass vessel. This identification code is read by moving the glass wall with the projections in the radiation beam between the radiation source and the detector consisting of several radiation sensitive diodes. Since the projections acting as lenses influence the local intensity of the radiation beam, the output signal of the radiation-sensitive diodesis detectably varied. In an alternative reading mode also described in the above cited Patent Specification it is not the lensing action of the projections which is used, but the reflective action which gives rise to detectable variations as a result of the strong curvature of the surface of the glass wall at the position of the projections. In this situation the radiation source and the detector are disposed on the same side of the wall of the glass vessel.

The device as described in the above-cited British Patent Specification No. 1,580,735 cannot be used for objects which are opaque and/or whose surfaces per object have very different reflective properties caused for example by external influences during the lifetime of the object. These objects may be manufactured of, for example fairly soft but tough synthetic material. They may also be objects which are deformed during a manufacturing process or are subjected to surface treatments such as sandblasting or lacquering. The invention has for its object to provide a device for optically identifying objects in which the transparency and the surface properties of the material from which the object is manufactured do not affect substantially the feasibility of the identification procedure.

To this end a device for optically identifying objects according to the invention is characterized in that the chief ray of the beam emitted by the source extends at an acute angle to the normal on the surface and in that the radiation incident on the radiation-sensitive detection system is modulated by the shadow effect of the relief structure.

The invention is based on the recognition that the shadow of a relief structure having sufficiently large differences in height can be observed on all surfaces, except for extremely radiation-absorbing surfaces. The details of the relief structure may consist of both local elevations of the surface and of local indentations of, or recesses in the surface.

It is noted that it is known per se, for example from European Patent Application No. 0,134,996 to recognize an irregularity on a surface by detection of the shadow caused by the irregularity. However, the said European Patent Application relates to the detection of a fold in, or the flap of, an envelope and it does not relate to reading an identification code.

A preferred embodiment of an identification device according to the invention is characterized in that the angle between the chief ray and the normal on the surface is between approximately 45° and approximately 70°. At such an angle satisfactorily observable shadows are formed which do not blend with each other at distances between details of the relief pattern of the order of magnitude of the details themselves.

A further embodiment of the identification device according to the invention is characterized in that the cross-section of the radiation beam at the area of the relief structure is at least equal to the dimensions of said structure and in that the radiationsensitive detection system is an image-scanning system. The advantage thereof is that the object does not have to make a prescribed movement with respect to the identification device, but may be stationary or may be moved by means of a transport device. Thus the movement of a continuing stream of objects, for example on a conveyor belt in a sorting device, does not have to be influenced by the identification procedure.

A preferred embodiment of a device according to the invention is characterized in that the detector is adapted to observe a two-dimensional image. Such a detector may be, for example, a television camera combined with a micro-computer for analysing the observed pattern. When using a detector observing a two-dimensional surface area it is possible to arrange the code in a two-dimensional pattern, for example in a square-shaped or rectangular matrix where the information in each matrix cell is formed by the presence or absence of a dot represented by an elevation, indentation or recess. Such a dot code in which the dots may be arranged in a two-dimensional matrix is known and in principle any desired binary coding method can be used.

As compared with the known bar code the use of the dot code has the advantage that only the presence or absence of a dot needs to be detected. In the known bar code used for product identification in commerce part of the information is contained in the width of the bars, a dot code in relief has the advantage that the permissible tolerances with respect to the positioning of radiation source and detector may be much wider. As compared with the bar code, a dot code also has the advantage that it can be read in a plurality of directions and that the quantity of information per surface unit may be larger.

An optical identification device according to the invention may be further characterized in that the radiation source is adapted to emit short intense flashes of radiation and in that the radiation sensitive element in the detection system has a storage effect.

By exposing the identification code briefly and intensely, an instantaneous image of the identification pattern is formed on the radiation-sensitive element of the detection system, which instantaneous image need not be read until after some time has elapsed. In such a device the movement of the object may be rapid with respect to the read-time of the detection system. A detection system satisfying this requirement is, for example a conventional T.V.-camera.

The device may also be constructed in such a manner that a plurality of radiation-sensitive detection systems can be used simultaneously. To this end an optical identification device according to the invention is characterized in that it comprises at least one radiation source and a plurality of radiation sensitive detection systems. When using one radiation source, this is, for example an elongated source which exposes a plurality of objects simultaneously. When using a plurality of separate radiation sources, each detection system is associated with a radiation source.

Figure 3:
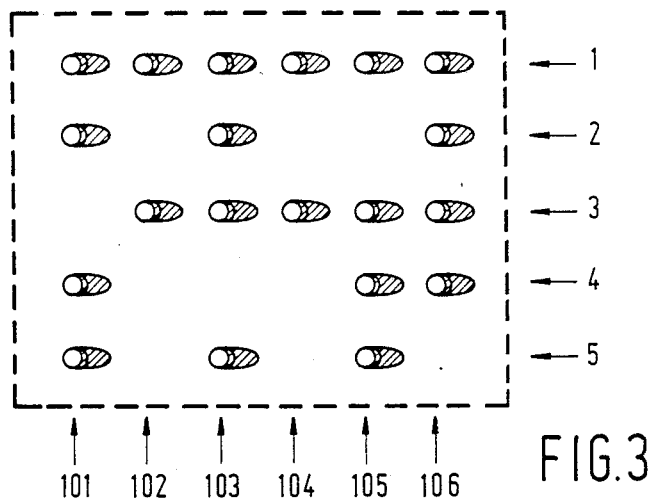
Figure 4:
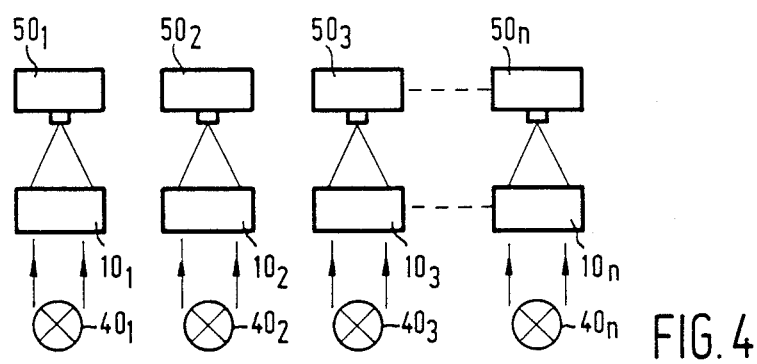

The invention will now be described in greater detail with reference to the accompanying drawing in which FIG. 1 shows diagrammatically an embodiment of an optical identification device according to the invention, FIG. 2 shows a detail of FIG. 1, FIG. 3 shows a possible code which may be used for identifying objects, and FIG. 4 shows diagrammatically a device having a plurality of detection systems.

In FIG. 1 an object 10 shown as a cube is passed on a convey or belt 20 along an optical identification device. An identification code 30 in the form of a relief pattern is provided on one side 11 of the object. This pattern may be a two-dimensional matrix in which in a number of locations hemispheres 31 are disposed. Instead of spheres it is also possible to use, for example cylinders or cubes. However, as compared with cylinders or cubes, spheres have the advantage that they are less sensitive to damage and that dirt in the interstices gives way more rapidly.

In FIG. 2 the surface with the hemispheres is shown in detail. A light source 40 emits radiation which can be formed to a beam by means of a reflector 41 or a projection lens 42. The radiation beam 43 is obliquely incident on the surface 11 of the object 10 so that the hemispheres 31 cast a shadow 32 on the surface 11. The detector 50, for example a T.V.-camera, observes the image in which the shadows 32 of the hemispheres 31 contrast to the lit surface 11. The observed pattern of shadows is converted to an identification code with the aid of computer 51, for example a micro-processor.

The shape of the details of the relief structure may be arbitrary, provided that these details cast a sufficiently large shadow. The shadows cast by the details 31 should be distinguishable from those cast by scratches or impurities or irregularities, if any, on the surface and the shadows of single details should be clearly separate from each other. When using hemispheres, this is, for example the case for a spherical diameter which is considerably larger than the irregularities of the surface and a distance between the spheres (centre to centre) of twice to three times the diameter. When using different relief structures, such as cylinders standing on or recessed in the surface, similar criteria are to be taken into account.

FIG. 3 shows a possible identification code. This code consists of a matrix of elements arranged in six columns and five rows. The upper element of each column has an elevation, indentation or recess with which the presence of the column is indicated. The actual information is contained in the sub-matrix consisting of the rows 2,3, and 4 and the columns 101, 102, 103, 104 and 105. Each column represents one of the digits 0 to 7 in a binary code. The associated designation thereof may be, for example : column 101 contains a code for the identification of the matrix in which the object is formed, column 102 contains a code for the producer of the object, columns 103 and 104 combined contain a code for the production month and column 105 contains a code for the owner of the object. The row 5 and the column 106 have parity dots so that an error in the code can be detected.

The above-described codes and designations are only examples and by extending the number of columns and rows more information can be stored in the identification code and/or the error detection can be supplemented with a possibility of error correction, as has been described extensively in literature. In this respect reference is made to U.S. Pat. No. 4,263,504.

FIG. 4 is a plan view of an embodiment of the optical detection device having a plurality of detectors $50_1, \ldots, 50_n$ with which a number of objects can be identified simultaneously or with which each of these objects can be identified fewer times in succession. A separate radiation source $40_1, \ldots, 40_n$ may be provided for each of the detectors, for example television cameras. It is alternatively possible to use one elongated radiation source.

What is claimed is:

1. A device for optically identifying objects, a surface of which has a relief structure having a plurality of individual markings which constitute an identification pattern, which device comprises a radiation source emitting a radiation beam which is incident concurrently upon the plurality of individual markings of the entire relief structure of the surface, and radiation-sensitive detection means disposed in the path of radiation originating from the surface, wherein the chief ray of the beam omitted by the source extends at an acute angle to the normal of the surface and the radiation, originating from the surface, which is incident concurrently on the radiation-sensitive detection means, is modulated by the shadow effect of the details of the entire relief structure of the surface, so that the entire identification pattern is incident concurrently onto the detection means.

2. A device as claimed in claim 1, characterized in that the angle between the chief ray and the normal on the surface is between approximately 45° and approximately 70°.

3. A device as claimed in claim 1 or 2, characterized in that the cross-section of the radiation beam at the area of the relief structure is at least equal to the dimensions of said structure and in that the radiation-sensitive detection system is an image-scanning system.

4. A device as claimed in claim 3, wherein the detection means is adapted to detect a two-dimensional image.

5. A device as in claim 3, wherein the radiation source is adapted to emit short intense flashes of radiation and the detection means comprises image-scanning radiation sensitive element means which store the image.

6. A device as claimed in claim 1 or 2 characterized in that said device has at least one radiation source and a plurality of radiation-sensitive detection systems.

* * * * *